US012580344B2

(12) United States Patent
Chen et al.

(10) Patent No.: US 12,580,344 B2
(45) Date of Patent: Mar. 17, 2026

(54) CABLE END CONNECTOR WITH LATCH

(71) Applicant: BIZLINK (KUNSHAN) CO., LTD., Kunshan (CN)

(72) Inventors: Shi-Jung Chen, Kunshan (CN); Yi-Hsing Chung, Kunshan (CN)

( * ) Notice: Subject to any disclaimer, the term of this patent is extended or adjusted under 35 U.S.C. 154(b) by 297 days.

(21) Appl. No.: 18/335,129

(22) Filed: Jun. 14, 2023

(65) Prior Publication Data

US 2024/0072489 A1 Feb. 29, 2024

(30) Foreign Application Priority Data

Jun. 15, 2022 (CN) ......................... 202210676792.9

(51) Int. Cl.

| | |
|---|---|
| ***H01R 13/627*** | (2006.01) |
| *H01R 12/72* | (2011.01) |
| *H01R 12/77* | (2011.01) |
| *H01R 13/62* | (2006.01) |
| *H01R 13/629* | (2006.01) |
| *H01R 13/633* | (2006.01) |
| *H01R 13/639* | (2006.01) |

(52) U.S. Cl.

CPC ....... *H01R 13/6275* (2013.01); *H01R 12/721* (2013.01); *H01R 12/771* (2013.01); *H01R 13/62* (2013.01); *H01R 13/62933* (2013.01); *H01R 13/62966* (2013.01); *H01R 13/633* (2013.01); *H01R 13/639* (2013.01)

(58) Field of Classification Search

CPC ......................... H01R 13/6275; H01R 12/721; H01R 12/771; H01R 13/62; H01R 13/62933; H01R 13/62966; H01R 13/633; H01R 13/639

See application file for complete search history.

(56) References Cited

U.S. PATENT DOCUMENTS 10,886,649 B1 * 1/2021 Yang .................... H01R 12/716
11,664,623 B2 * 5/2023 Yu ...................... H01R 13/6275 439/352
2021/0408727 A1 * 12/2021 Fan .................... H01R 13/6275

FOREIGN PATENT DOCUMENTS

CN 208797272 U * 4/2019
CN 209692064 U 11/2019

* cited by examiner

*Primary Examiner* — Justin M Kratt
(74) *Attorney, Agent, or Firm* — SOROKER AGMON NORDMAN

(57) ABSTRACT

Disclosed is a cable end connector. The cable end connector includes: a base; a circuit board fixedly disposed in the base; a cable connected to the circuit board; and a latch fixedly disposed in a mounting groove of the base. The latch has a body portion and a bent portion formed by bending downwards from a rear edge of the body portion, the bent portion can abut against the base, and the body portion has a plurality of hooks extending forwards. The cable end connector further includes a connecting shaft, a mounting space for the connecting shaft to penetrate through is formed between the body portion and the bent portion, and the connecting shaft penetrates through the mounting space and is inserted into a connecting hole of the base, which can prevent the latch from falling off and has better connection reliability.

9 Claims, 7 Drawing Sheets

B-B

CABLE END CONNECTOR WITH LATCH

FIELD OF TECHNOLOGY

The present disclosure relates to a cable end connector, in particular to a cable end connector with better connection reliability.

BACKGROUND

The patent document CN208797272U describes a high-speed cable connector featuring a deformable buckling piece (or say latch) that can be unlocked when its pressing portion is engaged. However, under extraordinary conditions such as impact, the limiting arms fail to prevent the hook portions on either side of the buckling piece from disengaging from the two clamping grooves. This potential failure can lead to the buckling piece detaching from the housing, which compromises the connection's reliability.

SUMMARY

The present disclosure relates to an improved cable end connector, which can prevent a latch from falling off and has better connection reliability.

An embodiment of the present invention relates to a cable end connector, including a base, a circuit board, a cable, a latch, and a connecting shaft. A recessed mounting groove and one or more connecting holes fitted with the connecting shaft are provided in an upper surface of the base; the circuit board is fixedly disposed in the base; the cable is connected to the circuit board; the latch is disposed in the mounting groove, the latch has a body portion and a bent portion formed by bending downwards from a rear edge of the body portion, the bent portion is capable of abutting against the base, and the body portion has a plurality of hooks extending forwards; a mounting space for the connecting shaft to penetrate through is formed between the body portion and the bent portion, and the connecting shaft penetrates through the mounting space and is inserted into the connecting hole(s).

The connecting shaft is disposed on a bent position of the latch and inserted into the connecting hole of the base, and the latch is movably connected to the base through the connecting shaft, such that it is ensured that in a case where the hook of the latch is connected with other components (such as a board end connector) or the latch is deformed to disconnect the hook with other components, the latch can be firmly connected to the base, and the latch will not be separated from the base under an accidental condition of an impact, or the like, thus preventing accidental loosening of the latch, and improving the connection reliability.

BRIEF DESCRIPTION OF DRAWINGS

FIG. 1 is a perspective view of a cable end connector according to an embodiment of the present disclosure.

FIG. 2 is a perspective view of a latch in the embodiment of the present disclosure at a viewing angle.

FIG. 3 is a perspective view of the latch in the embodiment of the present disclosure at another viewing angle.

FIG. 4 is a schematic diagram of a base and a pull-string in the embodiment of the present disclosure, wherein the latch is not shown.

FIG. 5 is a top view of the cable end connector according to the embodiment of the present disclosure.

FIG. 6 is a sectional view along A-A in FIG. 5.

FIG. 7 is a sectional view along B-B in FIG. 5.

DETAILED DESCRIPTION OF THE EMBODIMENTS

Figure 1:
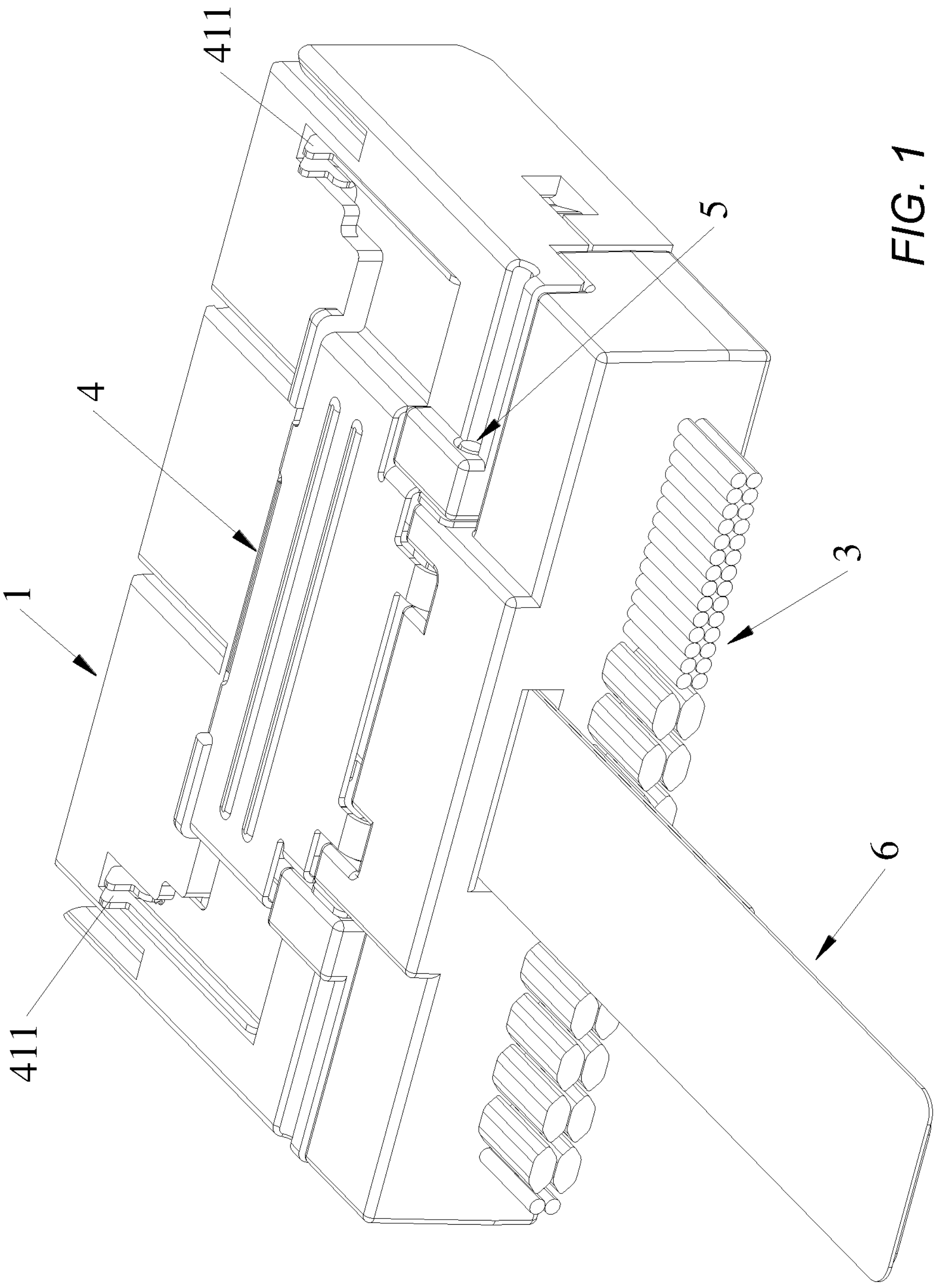
FIGS. 1 to 7 are drawn according to the true scale of an actual design, and therefore, positions and scales of all elements are regarded as part of the disclosure.

One of possible embodiments of the present invention relates to a cable end connector configured to be connected with a board end connector to realize mechanical connection and electrical connection between a cable and a control board. The cable end connector includes, but is not limited to, an SAS series connector of a server. Referring to FIGS. 1 to 7, the cable end connector includes a base 1, a circuit board 2, a cable 3, a latch 4, a connecting shaft 5 and an actuating piece.

Figure 6:
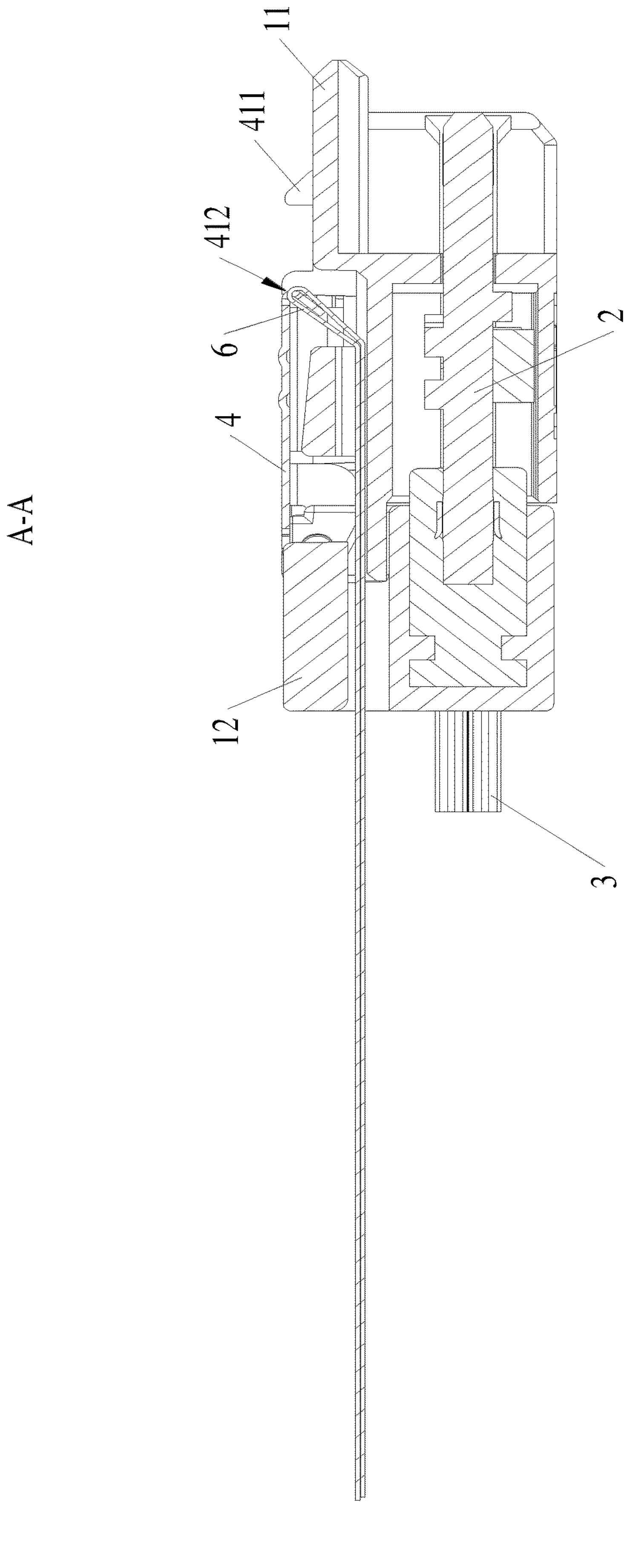

Referring to FIGS. 1, 4, 6 and 7, a plurality of cables 3 are provided, and the cables 3 are soldered on the circuit board 2 and electrically connected thereto. As shown in FIG. 6, the base 1 mainly includes an inner molding piece, a front base 11, and a rear base 12. The inner molding piece is directly formed on a surface of the circuit board 2 by an injection molding process and wraps a connecting part of the cable 3 and the circuit board 2, and the inner molding piece is mainly formed by plastic. The rear base 12 (also called an outer molding piece) is directly formed outside the inner molding piece by an injection molding process. The front base 11, also called a shell, is prefabricated by plastic and then directly fixed at a front end of the rear base 12.

Figure 4:
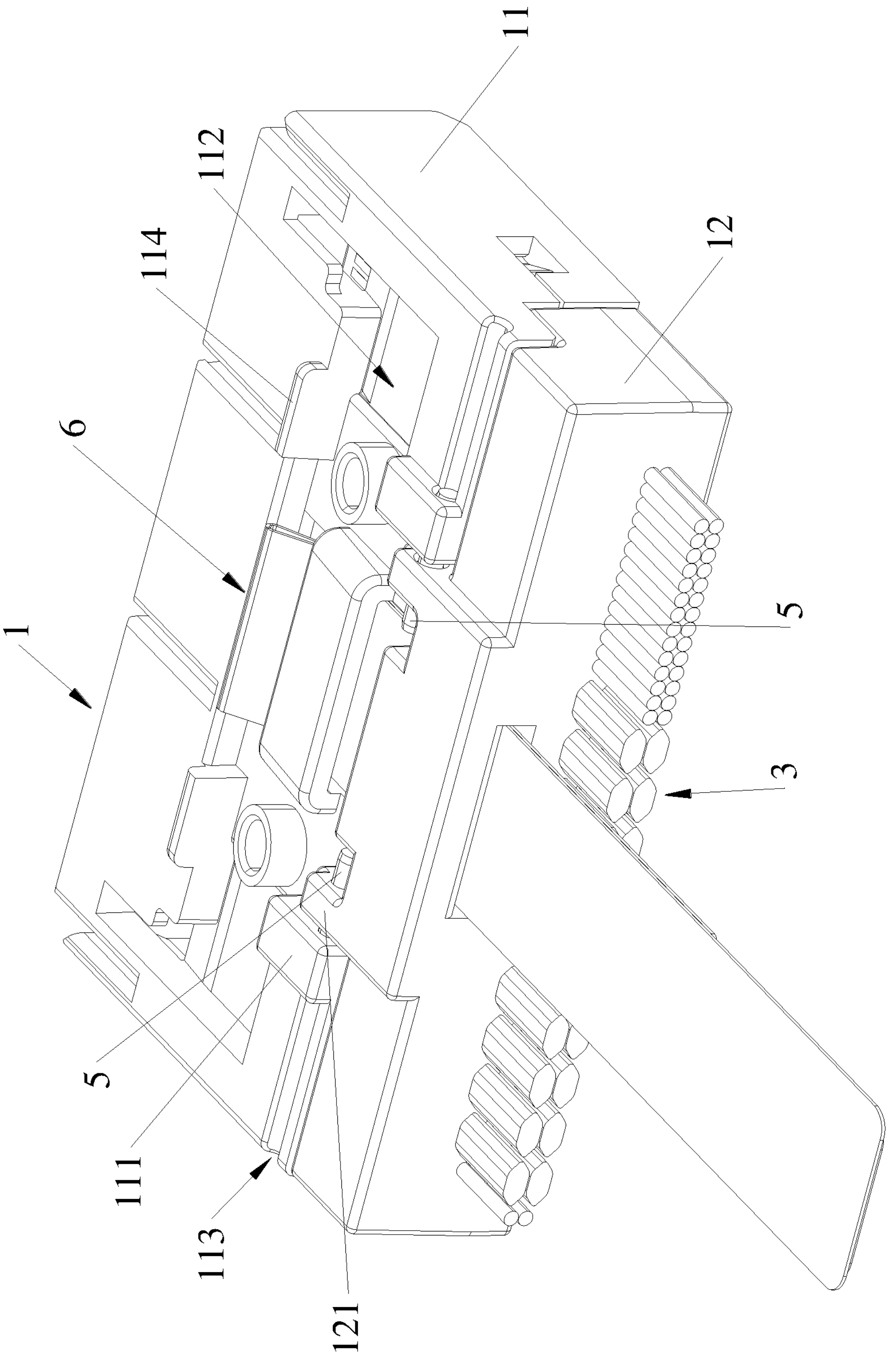
Figure 5:
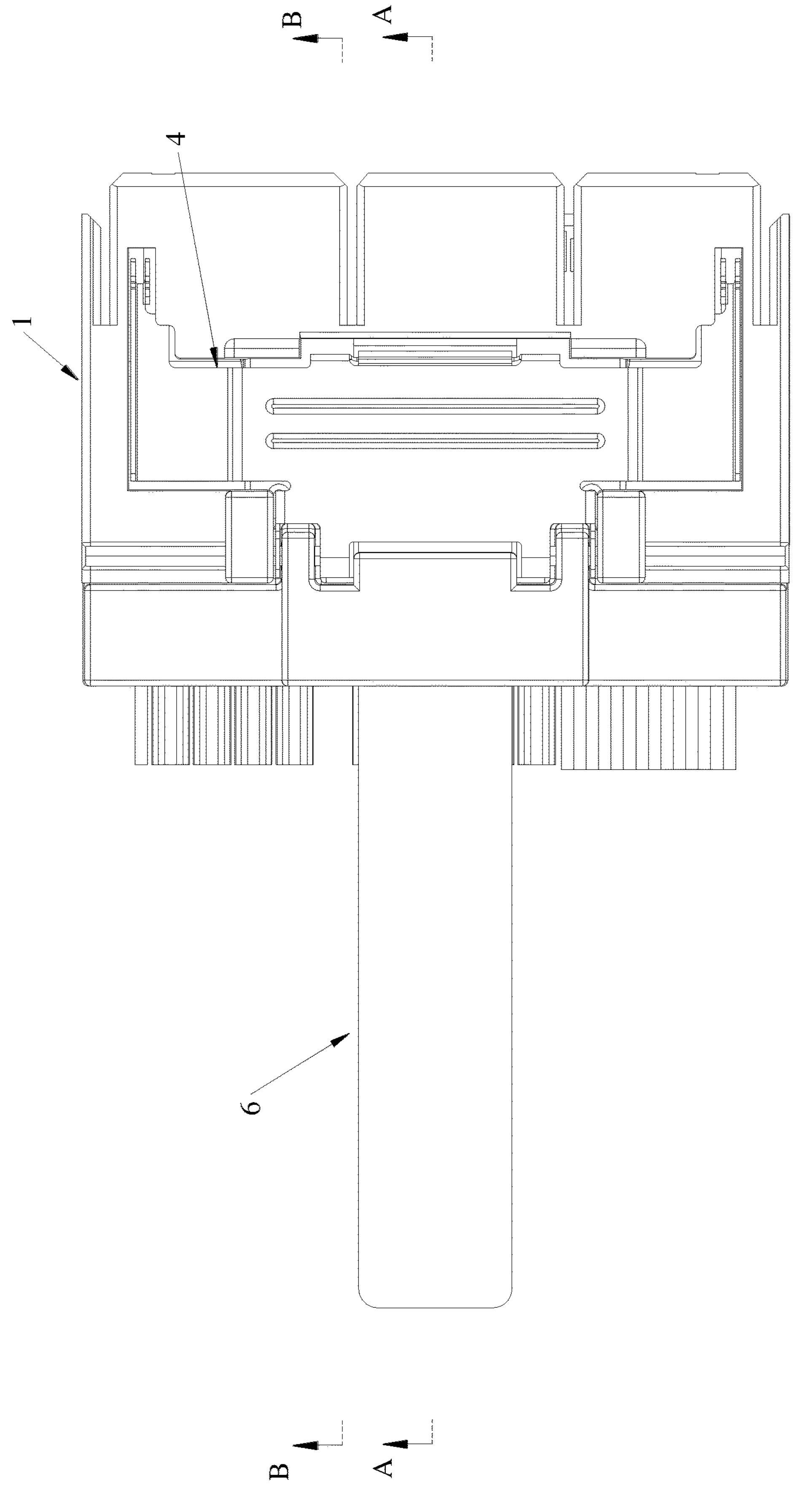

Referring to FIGS. 4 and 5, the front base 11 is left-right symmetric, and has a plurality of protrusions 111, a mounting groove 112, a shaft groove 113, and a limiting portion 114. In particular, the front base 11 is left-right symmetric, a pair of protrusions 111 extending upwards are located at a part of a rear portion of an upper surface of the front base 11 close to the rear base 12, the protrusions 111 are spaced apart left and right, each protrusion 111 has a connecting hole, the connecting hole preferably penetrates through the protrusion 111 along a left-right direction (widthwise), and the connecting holes of the two protrusions 111 are coaxially arranged. Two shaft grooves 113 are further provided on the upper surface of the front base 11, and each shaft groove 113 has one end communicated with the connecting hole of the protrusion 111 and the other end extending to a left or right edge of the front base 11, and a cross section of the shaft groove 113 in a front-rear direction is semicircular.

In another part, the mounting groove 112 recessed downwards is mainly located at a middle part of the front base 11, the mounting groove 112 has an opening facing upward, and the mounting groove 112 is approximate U-shaped; that is, a central part thereof is approximately rectangular, and each of a left side and a right side of the rectangular groove is connected with an L-shaped and forwards extending long slot.

As shown in FIG. 4, a bridge-shaped structure is provided at a bottom of the mounting groove 112 of the front base 11, and a through hole penetrating in a front-rear direction is provided between the bridge-shaped structure and the bottom of the mounting groove 112 for allowing a drawstring 6 to pass therethrough.

The limiting portion 114 protruding from the upper surface is located at a front end part of the mounting groove 112 of the front base 11. A top surface of the limiting portion 114 has a substantially same height as the protrusion 111.

As shown in FIG. 4, a pair of upwardly extending protrusions 121 are located at a front end of the rear base 12, the protrusions 121 are spaced apart left and right, each protrusion 121 has a connecting hole therein, and the connecting hole preferably penetrates through the protrusion 121 in the left-right direction (widthwise). The two protrusions 121 are located between the two protrusions 111, and the transverse connecting holes in the protrusions 111 and the connecting holes in the rear base 12 can be aligned and overlapped. Each of a left side portion and a right side portion has one protrusion 121, the rear base 12 further has a forwards facing limiting surface 122, and the limiting surface 122 is located between the two protrusions 121.

On the other hand, as shown in FIG. 4, a tunnel (or say, a through hole) is located at the central portion of the base 12, while the exit of the tunnel face towards the through hole formed under the bridge-shaped structure of the front base 111, so as to allow the pull-string 6 to pass through the rear base 12, moreover, the tunnel connecting the rear surface of the rear base 12 and the mounting groove 112.

Figure 7:
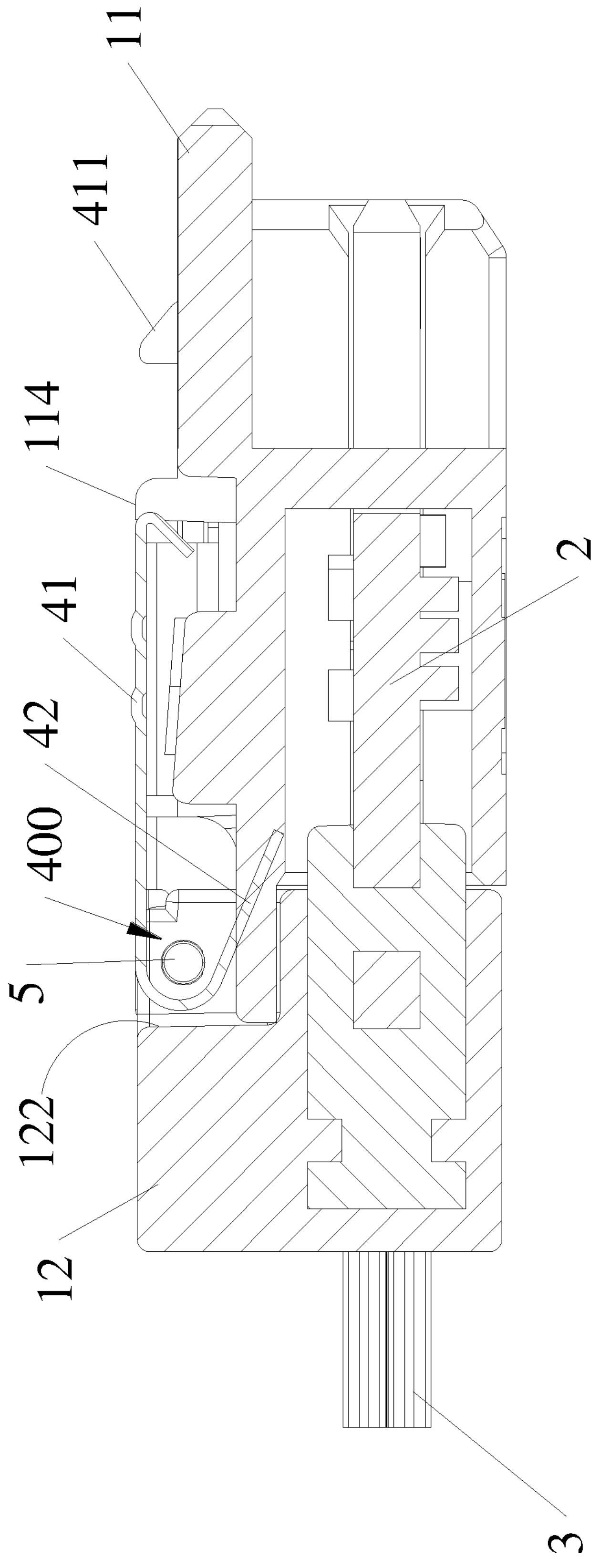

As shown in FIGS. 6 and 7, the rear portion of the circuit board 2 is covered and located in the rear base 12, and the circuit board 2 extends forwards to penetrate through the front base 11, such that a part of a front end of the circuit board provided with a contact pad (gold finger) penetrates out of the front base 11; specifically, in the present embodiment, the circuit board 2 is built in the base 1.

Figure 2:
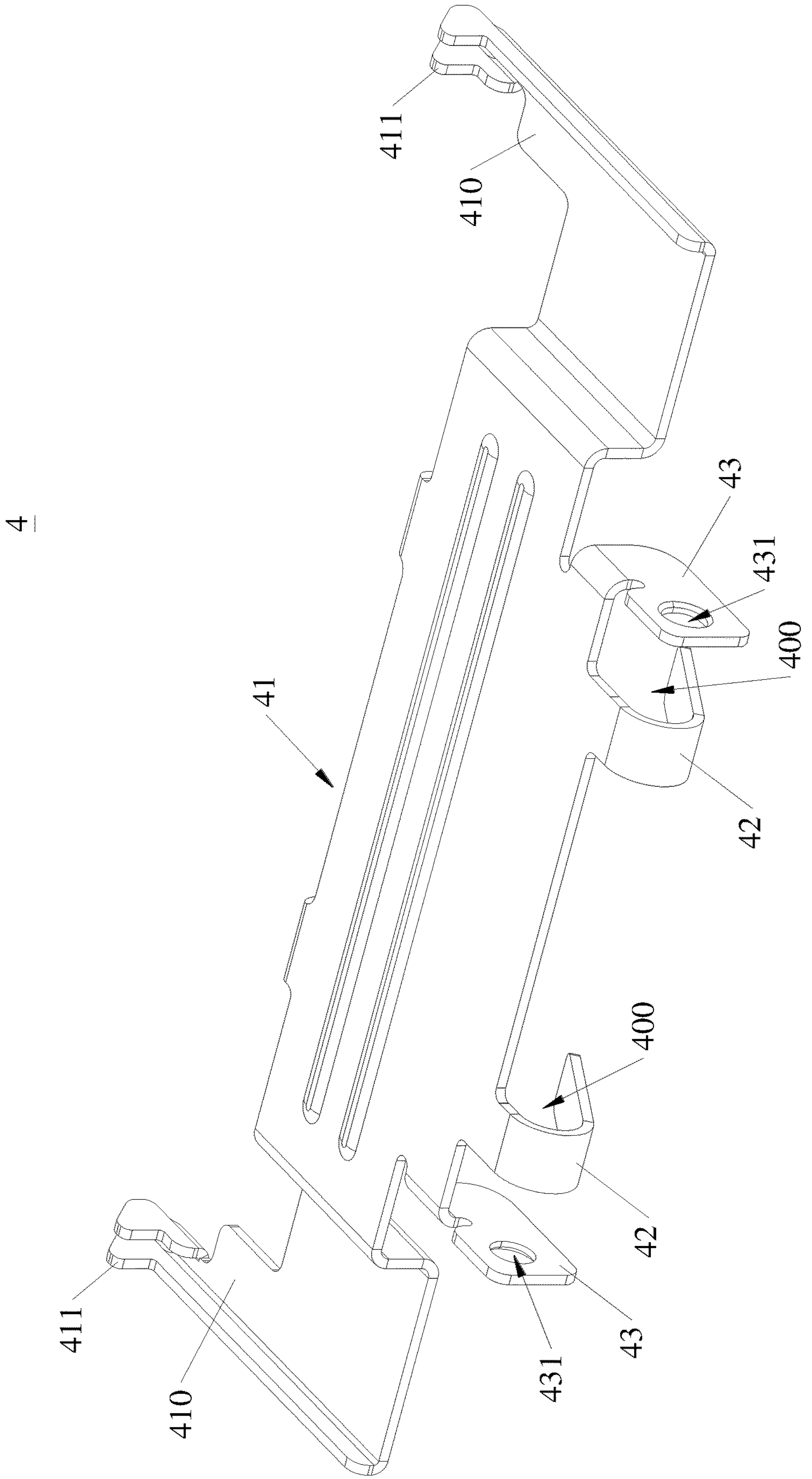
Figure 3:
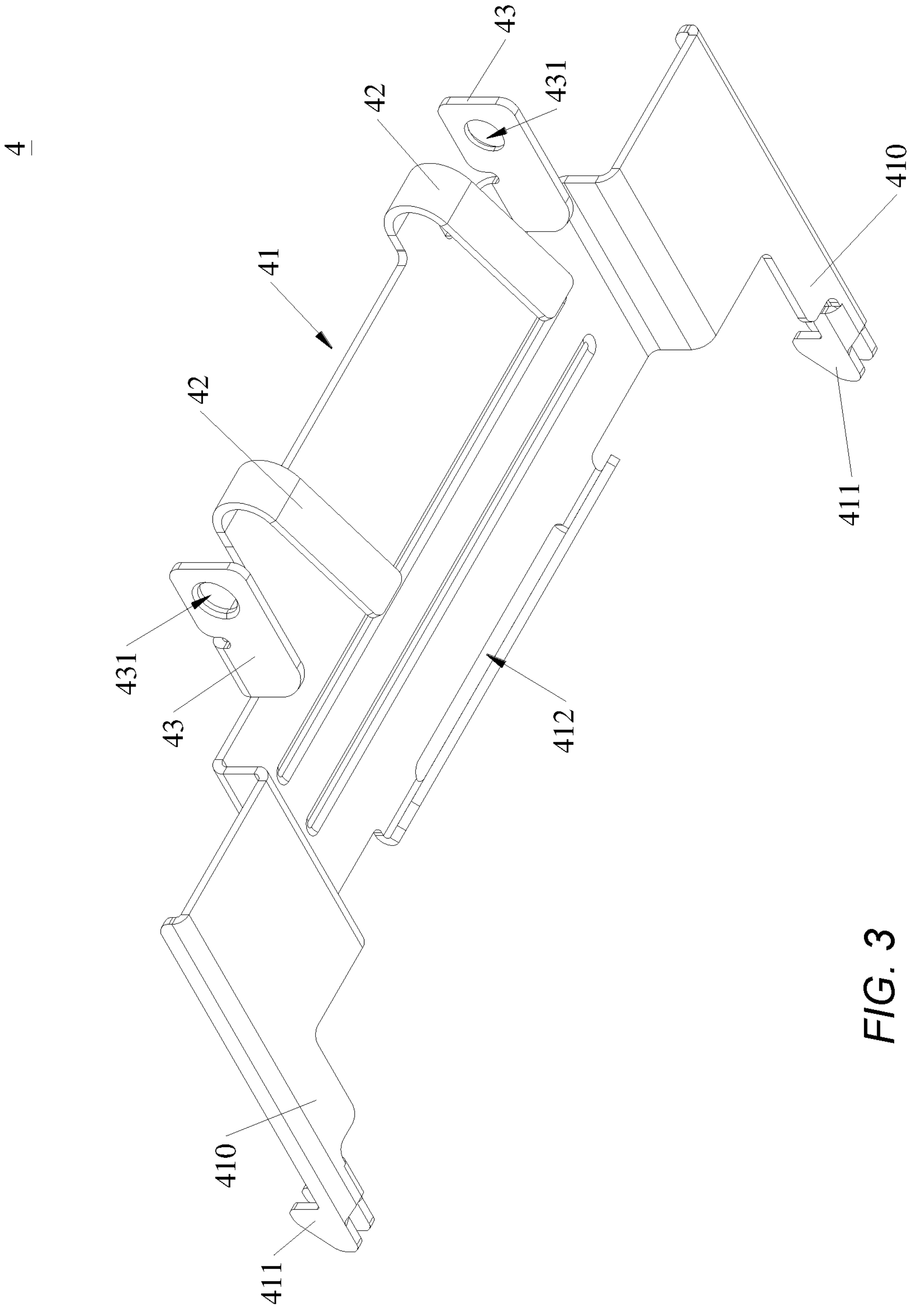

Referring to FIGS. 2 and 3, the latch 4 is integrally formed by a metal sheet, and has elasticity. The latch 4 has a body portion 41, the body portion 41 has two extension arms 410 extending forwards, a front end portion of each extension arm 410 has one hook 411 facing upwards, and the hooks 411 can move up and down along with deformation or restoration of the latch 4. A pull-string hole 412 is further formed at a front portion or a front edge of the body portion 41, and the pull-string hole 412 is located between the two extension arms 410. The latch 4 further has a bent portion 42, and the bent portion 42 is bent downwards from a rear edge of the body portion 41. At least a part of the bent portion 42 is bent below the body portion 41, and a mounting space 400 is formed between the body portion 41 and the bent portion 42. The latch 4 further has a connecting portion 43, the connecting portion 43 extends downwards from a rear portion of the body portion 41, and a through bole 431 is formed in the connecting portion 43. Specifically, in the present embodiment, two bent portions 42 are provided and spaced apart left and right, and two connecting portions 43 are provided and spaced apart left and right. The latch 4 is left-right symmetric, and each of a left side portion and a right side portion has one of the extension arms 410, the hooks 411, the bent portions 42 and the connecting portions 43.

As shown in FIG. 4, the connecting shaft 5 has an axis extending in the left-right direction and is configured to connect the latch 4 and the base 1. In the present embodiment, two connecting shafts 5 are provided and have coinciding axes.

The actuating piece is configured to separate the hook 411 from other components. In the present embodiment, the actuating piece is specifically the flexible pull-string 6 which overall extends in the front-rear direction. As shown in FIG. 6, a part of the pull-string 6 is inserted into the base 1 and located below the latch 4, and a front portion of the pull-string 6 is connected to the pull-string hole 412. After the pull-string 6 is pulled, the body portion 41 of the latch 4 can be bent downwards to move the hook 411 downwards.

A kind of connection between the base 1 and the latch 4 will be described below. The connecting holes on the front base 11, the connecting holes on the rear base 12, the through holes 431 on the connecting portions 43 and the connecting shafts 5 are matched with each other and can be aligned with each other, the connecting shaft 5 on the left side penetrates through the mounting space 400 between the body portion and the bent portion 42 on the left side and sequentially penetrates through the connecting hole on the left side portion of the rear base 12, the through hole 431 on the connecting portion 43 on the left side and the connecting hole on the left side portion of the front base 11, and the connecting shaft 5 on the right side penetrates through the mounting space 400 between the body portion and the bent portion 42 on the right side and sequentially penetrates through the connecting hole on the right side portion of the rear base 12, the through bole 431 on the connecting portion 43 on the right side and the connecting hole on the right side portion of the front base 11, so as to connect the latch 4, the front base 11 and the rear base 12; the latch 4 can rotate around the connecting shaft 5 relative to the base 1, as shown in FIG. 7. In other embodiments, one connecting shaft 5 may be provided, and a middle portion of the connecting shaft 5 penetrates through the mounting space 400 of the latch 4, and left and right end portions thereof are inserted into the connecting hole of the base 1 and the through hole 431 of the latch respectively. After the connection, the body portion of the latch 4 is substantially located in the mounting groove 112, and particularly, the hook 411 is completely buried in the mounting groove 112

During mounting, the connecting shaft 5 slides into the connecting hole from the shaft groove 113 on the front base 11. After mounting, a part of the bent portion 42 is located below the connecting shaft 5 and is in contact with the upper surface of the front base 11 or a distance away from the upper surface of the front base 11; after the pull-string 6 is pulled, the latch 4 rotates downwards around the connecting shaft 5, the bent portion 42 is deformed and abuts against the upper surface of the front base 11, and after the pull-string 6 is released, an elastic force of the latch 4 drives the bent portion to restore, and the hook 411 moves upwards. It should be noted that the bent portion 42 of FIG. 7 is embedded into a slot on the upper surface of the front base 11 in the manner shown in the drawing, so as to further enhance a horizontal holding force of the latch 4. On the other hand, the upper surface of the front base 11 can also be a flat surface without a slot, so as to allow the bent portion 42 to directly abut against the upper surface, and a similar effect can also be achieved. The above-mentioned slot may be a blind hole or a through hole penetrating through the front base 11.

Further, as shown in FIG. 7, the latch 4 is provided on the front base 11, and the limiting surface 122 on the rear base 12 is located on a rear side of the latch 4 to prevent the latch 4 from moving backwards, such that the latch 4 cannot be separated from the base 1 even if an accidental condition of an impact, or the like, occurs. The hook 411 and the extension arm 410 are located in the mounting groove 112 of the front base 11, and no blocking member, such as a cantilever, or the like, is required to be provided above the extension arm 410 or even the entire latch 4.

As shown in FIG. 7, the front base 11 further has the limiting portion 114, an upper surface of the limiting portion 114 is substantially the highest position of the whole front base 11, and the limiting portion is configured to limit the board end connector after the connection with the board end connector; the upper surface of the limiting portion 114 is higher than any position of the hook 411. On the other hand, when the latch 4 is completely mounted and is still, the latch 4 is completely buried in the mounting groove 112 of the upper surface of the front base 11; that is, the highest point of the latch 4 does not exceed the mounting groove 112 of the front base 11, thus further guaranteeing stability of the latch 4.

A process of connecting the cable end connector according to the present embodiment and the board end connector is described as follows: a front portion of the front base 11 is inserted into the board end connector, the hook 411 is hooked on the board end connector, and conduction is realized between the circuit board 2 in the base 1 and a terminal of the board end connector. A process of separating the cable end connector according to the present embodiment and the board end connector from each other is described as follows: the pull-string 6 is pulled backwards, the latch 4 rotates around the connecting shaft 5 and abuts against the upper surface of the front base 11 to be elastically deformed, the hook 411 moves downwards to be separated from the board end connector, the base 1 is pulled backwards, and the base 1 is pulled out of the board end connector; after the pull-string 6 is released, the latch 4 is restored, and the hook 411 moves upwards to an initial position for next connection.

In the cable end connector according to the present embodiment, the latch 4 is movably connected onto the base 1 through the connecting shaft 5, such that it is ensured that in a case where the hook 411 of the latch 4 is connected with other components (such as a board end connector) or the latch 4 is deformed to disconnect the hook 411 with other components, the latch 4 can be firmly connected to the base 1, and the latch 4 cannot be separated from the base 1 under the accidental condition of an impact, or the like, thus preventing accidental loosening of the latch 4, and improving the connection reliability.

It should be noted that, unless otherwise specified, when a feature is referred to as being "fixed" or "connected" to another feature, it can be directly fixed or connected to the other feature or indirectly fixed or connected to the other feature. In addition, the terms "upper", "lower", "front", "rear", "left", "right", etc. used in the present disclosure are described only relative to the mutual position relationship of the components of the present disclosure in the drawings, and reference may be made to FIG. 7, in which "upper", "lower", "front" and "rear" correspond to the upper side, lower side, right side and left side of the page in FIG. 7 respectively, and the left-right direction is a direction perpendicular to the page of FIG. 7.

The terms "a", "an" and "the" are to be construed as including one or at least one and the singular forms of the elements or components also include the plural forms unless the context clearly dictates otherwise.

The above-mentioned embodiments are merely illustrative of the technical concepts and features of the present disclosure, and are preferred embodiments, which are intended to enable those skilled in the art to understand the present disclosure and implement the present disclosure, and not to limit the protection scope of the present disclosure. All equivalent changes or modifications made in accordance with the principles of the present disclosure are intended to be included within the protection scope of the present disclosure.

What is claimed is:

1. A cable end connector, comprising:

a base having an upper surface provided with a recessed mounting groove;

a circuit board fixedly disposed in the base;

a cable connected to the circuit board;

a latch disposed on the mounting groove, the latch having a body portion and a bent portion extending downwards from a rear edge of the body portion, the bent portion being capable of abutting against the base, and the body portion having a plurality of hooks extending forwards; and a connecting shaft;

wherein the base has a connecting hole fitted with the connecting shaft, a mounting space for the connecting shaft to penetrate through is formed between the body portion and the bent portion, and the connecting shaft penetrates through the mounting space and is inserted into the connecting hole; and wherein the latch comprises a connecting portion, the connecting portion having a through hole, the connecting shaft penetration through the through hole and the connecting hole to connect the latch to the base.

2. The cable end connector according to claim 1, further comprising an actuating piece, the actuating piece is a pull-string, an end of the pull-string is connected to a pull-string hole of the latch.

3. The cable end connector according to claim 2, wherein the pull-string hole is located at a front edge of the body portion.

4. The cable end connector according to claim 1, wherein an axis of the connecting shaft extends widthwise.

5. The cable end connector according to claim 1, wherein a part of the bent portion is located below the connecting shaft and capable of abutting against the upper surface of the base.

6. The cable end connector according to claim 1, wherein the hook is completely buried in the mounting groove.

7. The cable end connector according to claim 1, wherein the body portion has a plurality of extension arms extending forwards, the plurality of hooks are formed on the extension arms, the upper surface of the base has the mounting groove, the mounting groove is upwardly facing and open, and the extension arms are located in the mounting groove.

8. The cable end connector according to claim 1, wherein the base comprises a front base and a rear base, the latch is disposed on the front base, and the rear base has a limiting surface located behind the latch and capable of preventing the latch from moving backwards.

9. The cable end connector according to claim 8, wherein each of the front base and the rear base has the connecting hole, and the connecting shaft penetrates through each connecting hole.

* * * * *